US008843366B2

(12) United States Patent
Zhang et al.

(10) Patent No.: US 8,843,366 B2
(45) Date of Patent: Sep. 23, 2014

(54) FRAMING METHOD AND APPARATUS

(75) Inventors: Dejun Zhang, Shenzhen (CN); Fengyan Qi, Shenzhen (CN); Lei Miao, Shenzhen (CN); Jianfeng Xu, Shenzhen (CN); Qing Zhang, Shenzhen (CN); Lixiong Li, Munich (DE); Fuwei Ma, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 891 days.

(21) Appl. No.: 12/982,142

(22) Filed: Dec. 30, 2010

(65) Prior Publication Data

US 2011/0099005 A1 Apr. 28, 2011

Related U.S. Application Data

(63) Continuation of application No. PCT/CN2009/076309, filed on Dec. 31, 2009.

(30) Foreign Application Priority Data

Dec. 31, 2008 (CN) .......................... 2008 1 0186854
Jun. 25, 2009 (CN) .......................... 2009 1 0151834

(51) Int. Cl.
*G10L 19/00* (2013.01)
*G10L 19/04* (2013.01)
*G10L 19/005* (2013.01)

(52) U.S. Cl.
CPC ............... *G10L 19/04* (2013.01); *G10L 19/005* (2013.01); *G01L 19/09* (2013.01)
USPC ............ 704/207; 704/206; 704/219; 704/220

(58) Field of Classification Search
USPC ................................. 704/207, 206, 219, 220
See application file for complete search history.

(56) References Cited

U.S. PATENT DOCUMENTS

| | | | | |
|---|---|---|---|---|
| 6,169,970 | B1 * | 1/2001 | Kleijn | 704/219 |
| 6,873,954 | B1 | 3/2005 | Sundqvist et al. | |
| 2002/0120440 | A1 * | 8/2002 | Zhang | 704/215 |
| 2005/0197833 | A1 | 9/2005 | Yasunaga et al. | |
| 2008/0215317 | A1 | 9/2008 | Fejzo | |
| 2010/0324913 | A1 * | 12/2010 | Stachurski et al. | 704/500 |

FOREIGN PATENT DOCUMENTS

| | | | |
|---|---|---|---|
| CN | 1971707 | A | 5/2007 |
| CN | 101030377 | A | 9/2007 |
| CN | 101286319 | A | 10/2008 |

(Continued)

OTHER PUBLICATIONS

Extended European Search Report dated (mailed) May 24, 2011, issued in related Application No. 09836080.3-1224, PCT/CN2009076309, Hauwei Technologies Co., Ltd.

(Continued)

*Primary Examiner* — Qi Han
(74) *Attorney, Agent, or Firm* — Huawei Technologies Co., Ltd.

(57) ABSTRACT

A framing method and apparatus are disclosed to overcome inconsistency of gains between sub-frames caused by simple average framing in the prior art. The method includes: obtaining the Linear Prediction Coding (LPC) order and the pitch of the signal; removing the samples inapplicable to Long-Term Prediction (LTP) synthesis according to the LPC prediction order and the pitch; and splitting the remaining samples of the signal into several sub-frames. The technical solution under the present invention is applicable to the multimedia speech coding field.

18 Claims, 9 Drawing Sheets

(56) References Cited

FOREIGN PATENT DOCUMENTS

| | | | |
|---|---|---|---|
| CN | 101615394 | A | 12/2009 |
| CN | 101615394 | B | 12/2009 |
| EP | 0347307 | A2 | 12/1989 |
| WO | WO9621221 | A1 | 7/1996 |
| WO | WO03/049081 | A1 | 6/2003 |
| WO | WO 2008/072736 | A1 | 6/2008 |

OTHER PUBLICATIONS

ITU-T, G.711.0, "Series G: Transmission Systems and Media, Digital Systems and Networks, Digital terminal equipments—Coding of voice and audio signals, Lossless compression of G.711 pulse code modulation" Sep. 2009.

Search report issued in corresponding European patent application No. 12185319.6, dated Mar. 27, 2013, total 6 pages.

International Search Report from the Chinese Patent Office in International Application No. PCT/CN2009/076309 mailed Apr. 15, 2010.

Sun, Wen-Yan, et al., "An dynamic variable-length packetization algorithm in real-time speech transmission", Journal of China Institute of Communications, vol. 22, No. 7, pp. 80-86, (Jul. 2001).

ITU-T, "Series G: Transmission Systems and Media, Digital Systems and Networks, Digital terminal equipments—Coding of voice and audio signals, Lossless compression of G.711 pulse code modulation", International Telecommunication Union, G.711.0, pp. i-ii and 1-72, (Sep. 2009).

ITU-T, "General Aspects of Digital Transmission Systems, Terminal Equipments, Pulse Code Modulation (PCM) of Voice Frequencies, ITU-T Recommendation G.711", International Telecommunication Union, G.711, pp. i-ii and 1-10, (1993).

* cited by examiner

FRAMING METHOD AND APPARATUS

CROSS-REFERENCE TO RELATED APPLICATIONS

This application is a continuation of international Application No. PCT/CN2009/076309, filed on Dec. 31, 2009, which claims priority to Chinese Patent Application No. 200810186854.8, filed on Dec. 31, 2008, and Chinese Patent Application No. 200910151834.1, filed on Jun. 25, 2009, all of which are hereby incorporated by reference in their entireties.

FIELD OF THE INVENTION

The present invention relates to speech coding technologies, and in particular, to a framing method and apparatus.

BACKGROUND OF THE INVENTION

When being processed, speech signal is generally framed to reduce the computational complexity of the codec and the processing delay. The speech signal remains stable in a time segment after the signal is framed, and the parameters change slowly. Therefore, the requirements such as quantization precision can be fulfilled only if the signal is processed according to the frame length in the short-term prediction for the signal. In addition, when a person utters a sound, the glottis vibrates at a certain frequency, and the frequency of the vibrate is considered as a pitch. When the pitch is short, if the selected frame length is too long, multiple different pitches may exist in one speech signal frame. Consequently, the calculated pitch is inaccurate. Therefore, a frame needs to be split into sub-frames on average.

In some lossless or lossy compression fields, to reduce the impact caused by packet loss in the network on the sound quality, the current frame needs to be independent of the previous frame. For example, the G.711 LossLess Coding (LLC) standard specifies that it is not allowed to use the data in the history buffer to predict the signal of the current frame. Therefore, the first part of the signal in current frame is used to predict the left part of the signal in current frame. If the prior art which splits the entire signal frame into several sub-frames on average is still applied, little data in the several sub-frames at the head are undergone by the Long Term Prediction (LTP) synthesis. As shown in FIG. 1, for the 8 kHz sampling rate and the 20 ms frame length, a frame is split into four sub-frames on average, and each sub-frame has 40 samples. Assuming the pitch of the first sub-frame is T[0]=34, the number of samples for synthesis through the LTP algorithm in the first sub-frame is only 40−34=6. The first 34 samples are treated as a history buffer of the subsequent sub-frames. In this way, the gain of the first sub-frame changes sharply as against the subsequent sub-frames, and the calculated gain of the first sub-frame is sharply different from that of the subsequent sub-frames, thus bringing inconvenience to subsequent processing. If T[0] is greater than the sub-frame length, even the second sub-frame is impacted.

SUMMARY OF THE INVENTION

Embodiments of the present invention provide a framing method and apparatus to solve the problem caused by simple average framing in the prior art that gains between sub-frames are inconsistent.

A framing method includes:

obtaining a Linear Prediction Coding (LPC) prediction order and a pitch of a signal;

removing samples inapplicable to LTP synthesis according to the LPC prediction order and the pitch; and splitting remaining samples of the signal into several sub-frames.

A framing apparatus includes:

an obtaining unit, configured to obtain a Linear Prediction Coding (LPC) prediction order and a pitch of a signal;

a sample removing unit, configured to remove the samples inapplicable to LTP synthesis according to the LPC prediction order and the pitch obtained by the obtaining unit; and a framing unit, configured to split remaining samples of the signal after the sample removing unit removes inapplicable samples into several sub-frames.

BRIEF DESCRIPTION OF THE DRAWINGS

To make the technical solution under the present invention clearer, the accompanying drawings for illustrating the embodiments of the present invention are described below. Evidently, the accompanying drawings are exemplary only, and those skilled in the art can derive other drawings from such accompanying drawings without creative work.

DETAILED DESCRIPTION OF THE INVENTION

The technical solution under the present invention is described below with reference to accompanying drawings. Evidently, the embodiments provided herein are exemplary only, and are not all of the embodiments of the present invention. Those skilled in the art can derive other embodiments from the embodiments provided herein without creative work, and all such embodiments are covered in the scope of protection of the present invention.

Figure 1:
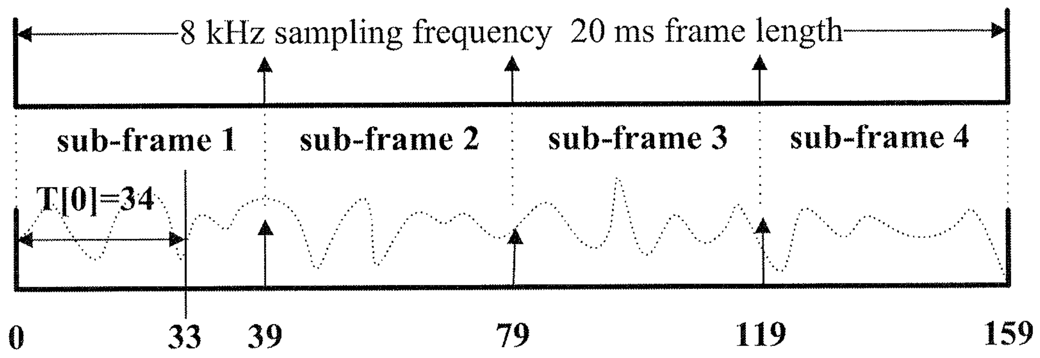
FIG. 1 shows an average framing method in the prior art.
Figure 2:
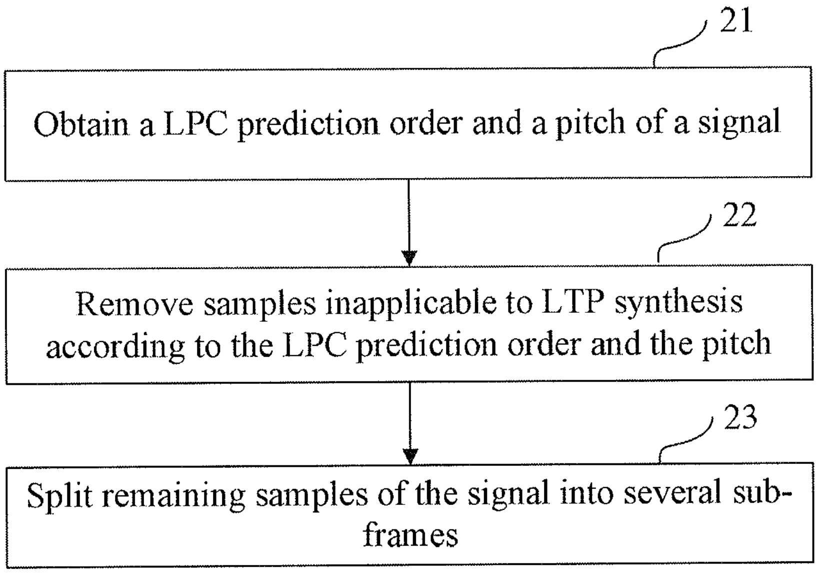
FIG. 2 is a flowchart of a framing method according to an embodiment of the present invention.

As shown in FIG. 2, a framing method provided in an embodiment of the present invention includes the following steps:

Step 21: Obtain a Linear Prediction. Coding (LPC) prediction order and a pitch of a signal.

Step 22: Remove samples inapplicable to LTP synthesis according to the LPC prediction order and the pitch.

Step 23: Split remaining samples of the signal into several sub-frames.

In the LPC, the LPC prediction may be a fixed mode or an adaptive mode. The fixed mode means that the prediction order is a fixed integer (such as 4, 8, 12, and 16), and may be selected according to experience or coder characteristics. The adaptive mode means that die final prediction order may vary with signals. Here “lpc_order” represents the final LPC prediction order.

For example, the method for determining the LPC prediction order in adaptive mode is used in this embodiment:

(1) Use the maximum prediction order to perform LPC analysis for the samples of the signal in a linear space to obtain reflection coefficients, namely, PARCOR coefficients: ipar[0], . . . , and ipar[N−1], where N is the maximum prediction order.

(2) Calculate the number of bits, namely, $B_c$[1], . . . , and $B_c$[N] of the quantized reflection coefficients in different orders.

(3) Use different orders to perform LPC prediction and obtain the predicted residual signals. Perform entropy coding for the residual signals to obtain the number of bits, namely, $B_e$[1], . . . , and $B_e$[N] required for entropy coding in different orders.

(4) Calculate the total number of bits, namely, $B_{total}$[1], . . . , and $B_{total}$[N] required for different orders, where $B_{total}[i]=B_e[i]+B_c[i]$.

(5) Find the minimum $B_{total}$[j] among $B_{total}$[1], . . . , and $B_{total}$[N], where j is the best order “lpc_order”.

Many other methods may be used to calculate the adaptive order “lpc_order”, and the present invention is not limited to the foregoing calculation method.

The LPC prediction refers to using the previous lpc_order samples to predict the value of the current sample. Evidently, for the lpc_order samples at the head of each frame, the prediction precision increases gradually (because more samples are involved in the prediction, more accurate value is obtained). Because the first sample is preceded by no sample, the LPC prediction is not applicable, and the predictive value of the first sample is 0. The LPC formula for the second sample to the last of the lpc_order samples is:

$$x'(n) = \sum_{i=1}^{n-1} a_i' \cdot x(n-i), \quad n = 1, \ldots, \text{lpc\_order} - 1 \tag{1}$$

The LPC formula for the samples after the lpc_order samples is:

$$x'(n) = \sum_{i=1}^{lpc\_order} a_i' \cdot x(n-i), \quad n \geq = \text{lpc\_order} \tag{2}$$

Assuming speech signal is expressed as x(n), where n=0, 1, . . . , L, and L is the signal length (namely, the number of samples such as 40, 80, 160, 240, 320 and other positive integers), the LPC residual signal is res(n):

$$\text{res}(n)=x(n)-x'(n). \tag{3}$$

Because the first lpc_order samples are predicted not precisely, the LPC residual signal obtained through LPC prediction is relatively large. To avoid the impact on the LTP synthesis performance, all or part of the samples in the interval that ranges from 0 to lpc_order may be inapplicable to LTP synthesis, and need to be removed.

In this embodiment, the obtained pitch may be the pitch T0 of the entire speech frame. T0 is obtained through calculation of the correlation function. For example, let d which maximizes the following value be T0:

$$\text{corr}(d) = \frac{\sum_{n=0}^{L1-1} res(n)res(n-d)}{\sqrt{\sum_{n=0}^{L1-1} res^2(n) \sum_{n=0}^{63} res^2(n-d)}}, \; 20 \leq d < 84 \tag{4}$$

where L1 is the number of samples used for computing the correlation function.

In some embodiments, if the speech frame is split beforehand, the obtained pitch may be the pitch of the first sub-frame of the speech frame which has undergone the framing.

Because the first part of the signal in the current frame are used to predict the left part of the signal in the current frame, a specific number of samples at the head of the current frame need to be removed to ensure consistent lengths of the sub-frames in the LTP synthesis, where the number is equal to the pitch.

In the framing method provided in this embodiment, according to the obtained LPC prediction order and the pitch, after the samples inapplicable to LTP synthesis are removed, the remaining samples of the signal are split into several sub-frames, thus ensuring that each sub-frame uses consistent samples for LTP synthesis and obtaining consistent LTP gains. Therefore, the embodiment solves the problem caused by simple average framing in the prior art that gains between sub-frames are inconsistent, reduces the computational complexity, and reduces the bits for gain quantization, without impacting the performance.

Figure 3:
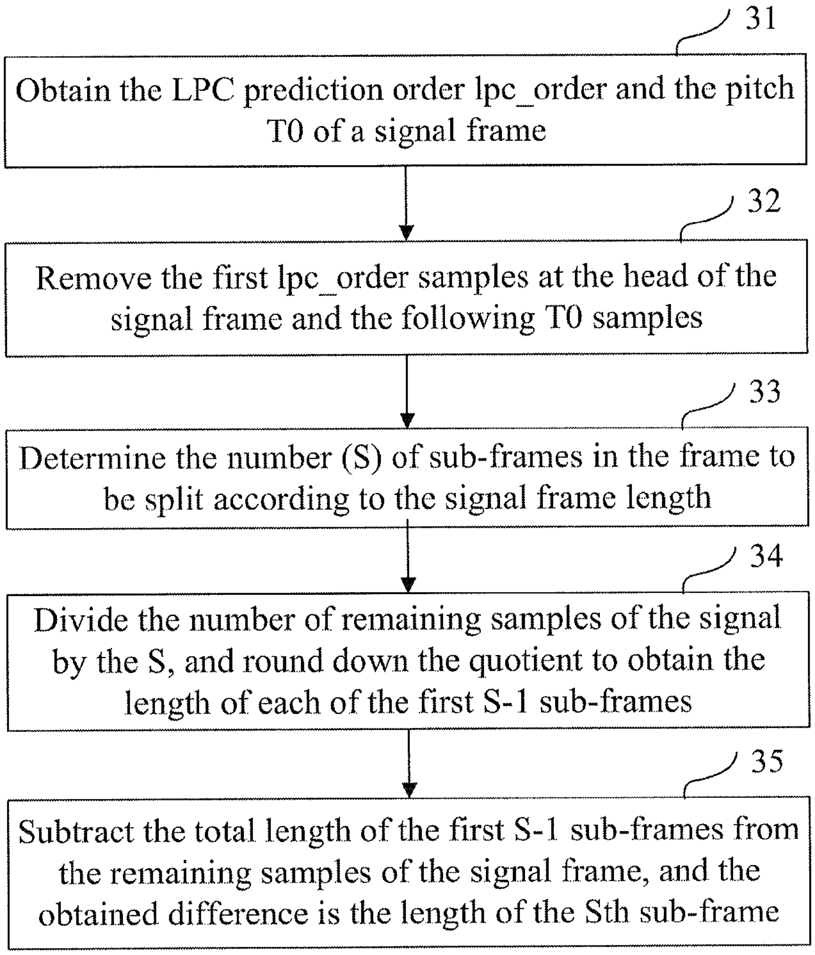
FIG. 3 is a flowchart of a framing method according to an embodiment of the present invention.

FIG. 3 shows a framing method in an embodiment of the present invention. This embodiment assumes that the obtained signal is one signal frame. The method includes the following steps:

Step 31: Obtain the LPC prediction order “lpc_order” and the pitch “T0” of a signal frame.

In some embodiments, if the signal frame is split beforehand, this step may also be: replacing the pitch “T0” by obtaining the pitch of the first sub-frame. For ease of description, T0 is taken as an example in this step in this embodiment and subsequent embodiments.

Step 32: Remove the first lpc_order samples at the head of the signal frame and the succeeding T0 samples.

The succeeding T0 samples refer to the T0 samples succeeding to the lpc_order samples. For example, a frame includes 100 samples 0-99, and the LPC prediction order is lpc_order=10 and the pitch is T0=20, and therefore, the first lpc_order samples (namely, samples: 0-9) in the frame are removed first, and then the succeeding T0 samples (namely, samples 10-29) are removed.

Step 33: Determine the number (S) of sub-frames in the frame to be split according to the signal frame length.

The frame is split into several sub-frames according to the length of the input signal, and the number of sub-frames varies with the signal length. For example, for the sampling at a frequency of 8 kHz, a 20 ms frame length can be split into 2 sub-frames; a 30 ms frame length can be split into 3 sub-frames; and a 40 ins frame length can be split into 4 sub-frames. Because the pitch of each sub-frame needs to be transmitted to the decoder, if a frame is split into more sub-frames, more bits are consumed for coding the pitch. Therefore, to balance between the performance enhancement and the computational complexity, the number of sub-frames in a frame needs to be determined properly.

In some embodiments, a 20 ms frame length constitutes 1 sub-frame; a frame of 30 ins length is split into 2 sub-frames; and a frame of 40 ins length is split into 3 sub-frames. That is, a frame composed of 160 samples includes only 1 sub-frame; a frame composed of 240 samples includes 2 sub-frames; and a frame composed of 320 samples includes 3 sub-frames.

The following description assumes that a frame of 20 ms length is split into 2 sub-frames. For other split modes, the subsequent operations are similar, and other split modes are also covered in the scope of protection of the present invention.

Step 34: Divide the number of remaining samples of the signal by the S, and round down the quotient to obtain the length of each of the first S-1 sub-frames.

That is, the length of each of the first S-1 sub-frames is $\lfloor(L-lpc\_order-T0)/S\rfloor$, where L is the frame length, and $\lfloor * \rfloor$ refers to rounding down, for example, $\lfloor 1.2\rfloor=1.9\rfloor=1$.

Step 35: Subtract the total length of the first S-1 sub-frames from the remaining samples of the signal frame. The obtained difference is the length of the Sth sub-frame.

Figure 4:
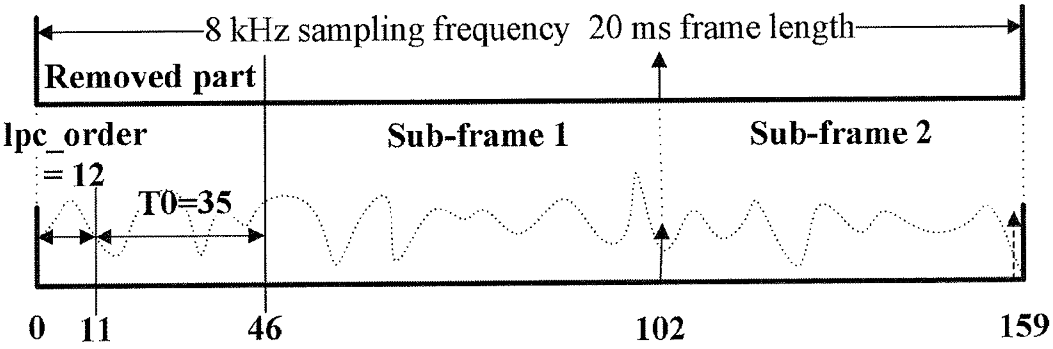
FIG. 4 shows an instance of the framing method shown in FIG. 3.

As shown in FIG. 4, this embodiment assumes that the sampling frequency is 8 kHz, and that a frame of 20 ms length is split into 2 sub-frames. The signal frame length is L=160 samples. The lpc_order of the obtained signal frame is 12 (samples), and the pitch T0 of the obtained signal frame is 35 samples. After the first lpc_order samples (12) and the T0 samples (35) are removed from the signal frame, the remaining L−(lpc_order+T0)=160−47=113 samples are divided by 2, and the quotient is rounded down. The result is that the length of the first sub-frame is 56 samples. The length of the second sub-frame, also the last sub-frame, is 113−56=57 samples.

In the framing method provided in this embodiment, according to the obtained LPC prediction order and the pitch, after the lpc_order samples at the bead of the signal frame and the succeeding T0 samples are removed, the remaining samples of the signal frame are split into several sub-frames, thus ensuring that each sub-frame uses consistent samples for LTP synthesis and obtaining consistent DT gains. Therefore, the embodiment solves the problem caused by simple average framing in the prior art that gains between sub-frames are inconsistent, reduces the computational complexity, and reduces the bits for gain quantization, without impacting the performance.

Figure 5:
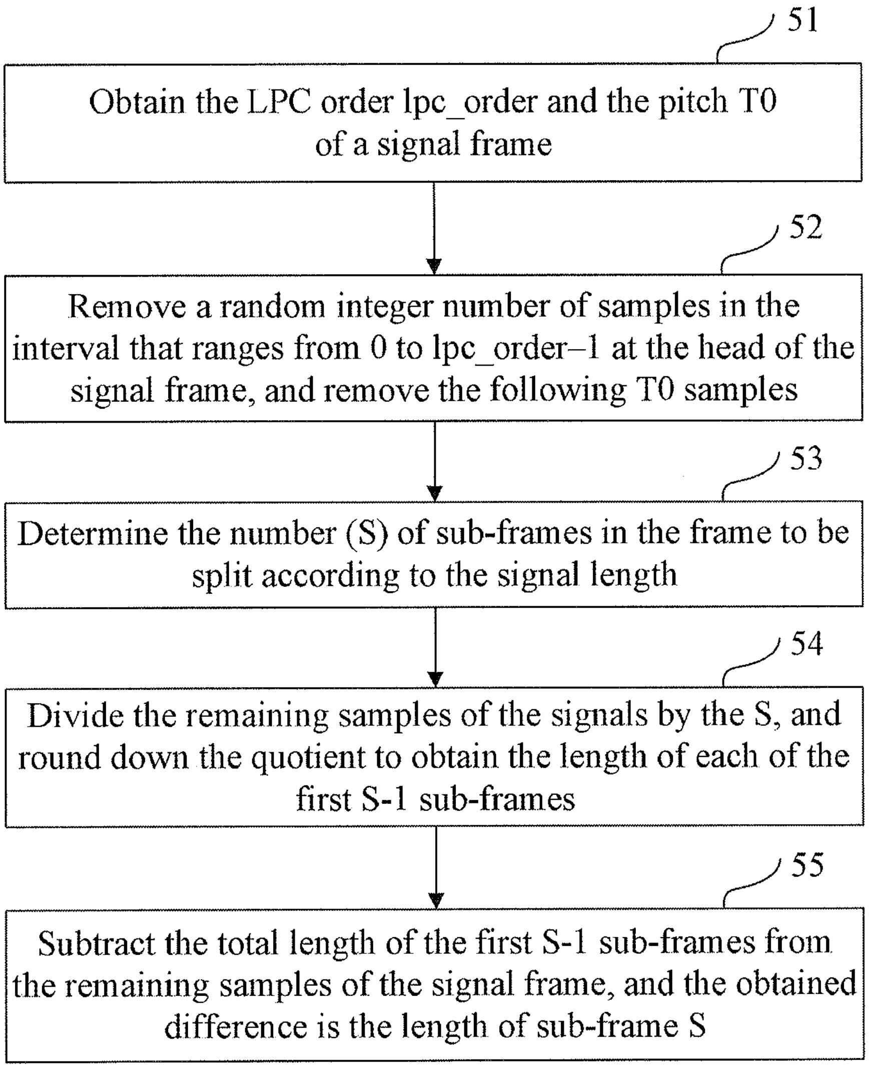
FIG. 5 is a flowchart of another framing method according to an embodiment of the present invention.

FIG. 5 shows another framing method in an embodiment of the present invention. This embodiment assumes that the obtained signal is one signal frame. The method includes the following steps:

Step 51: Obtain the LPC prediction order “lpc_order” and the pitch “T0” of the signal frame.

Step 52: Remove a random integer number of samples in the interval that ranges from 0 to lpc_order−1 at the head of the signal frame, and remove the succeeding T0 samples.

Step 53: Determine the number (S) of sub-frames in the frame to be split according to the signal frame length.

Step 54: Divide the number of remaining samples of the signal frame by the S, and round down the quotient to obtain the length of each of the first S-1 sub-frames.

Step 55: Subtract the total length of the first S-1 sub-frames from the remaining samples of the signal frame. The obtained difference is the length of the Sth sub-frame.

This embodiment differs from the previous embodiment in that: The removal of the samples inapplicable to LTP synthesis removes only part of the first lpc_order samples at the head of the signal frame and the succeeding T0 samples. Other steps are the same, and thus are not described further.

As analyzed above, the first lpc_order samples make the prediction inaccurate, but the following samples make the prediction more precise. Sometimes the samples that lead to high precision are involved in the LTP synthesis. To let more samples be involved in the LTP synthesis, in this embodiment, it is necessary to remove only part of the first lpc_order samples, for example, V samples, where V=0, 1, . . . , lpc_order−1. The value of V is a fixed value (such as 4 or 5) selected empirically, or obtained through calculation, for example, V=lpc_order/2. By letting more samples be involved in the LTP synthesis, this method may sometimes achieve a better effect than the previous method.

Figure 6:
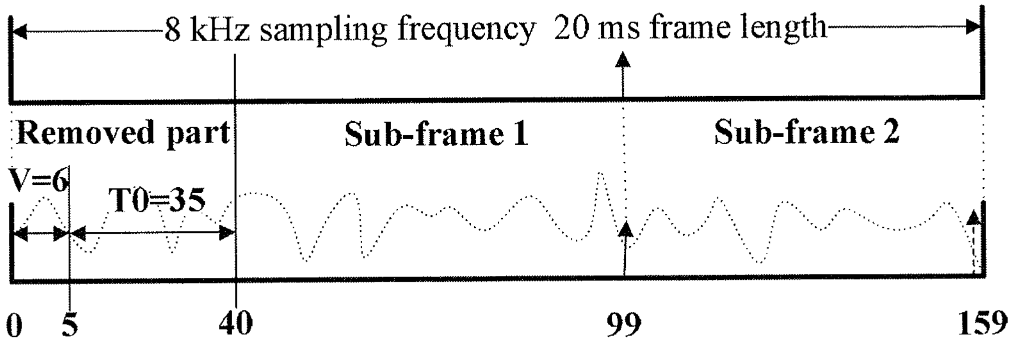
FIG. 6 shows an instance of the framing method shown in FIG. 5.

As shown in FIG. 6, it is still assumed that the sampling rate is 8 kHz, and that a frame of 20 ins length is split into 2 sub-frames. The signal frame length is L=160 samples; the LPC prediction order “lpc_order” of the obtained signal frame is 12 (samples); and the pitch “T0” is 35 samples. V among the first lpc_order samples at the head of the signal frame are removed, where V=lpc_order/2=6; and the succeeding T0=35 samples are removed. The remaining L−(V+T0)=160−6−35=119 samples are divided by 2, and the quotient is rounded down. The result is that the length of the first sub-frame is 59 samples. The length of the second sub-frame, namely, the length of the last sub-frame, is 119−59=60 samples.

Figure 7:
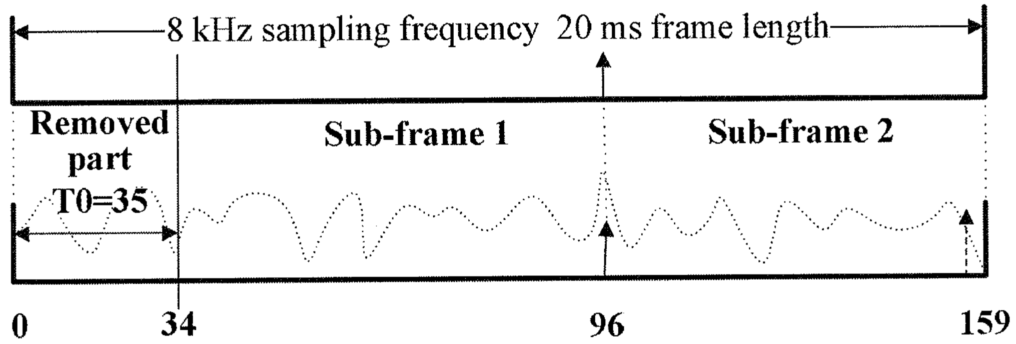
FIG. 7 shows another instance of the framing method shown in FIG. 5.

As shown in FIG. 7, an embodiment still assumes that the sampling frequency is 8 kHz, and that a frame of 20 ins length is split into 2 sub-frames. The signal frame length is L=160 samples; the LPC prediction order “lpc_order” of the obtained signal frame is 12 (samples); and the pitch “T0” is 35 samples. Only the first T0=35 samples are removed at the head of the signal frame, and all the lpc_order samples are involved in the LTP synthesis. The remaining L−T0=160−35=125 samples are divided by 2, and the quotient is rounded down. The result is that the length of the first sub-frame is 62 samples. The length of the second sub-frame, namely, the length of the last sub-frame, is 125−62=63 samples.

in the framing method provided in this embodiment, according to the obtained LPC prediction order and the pitch, after part of the first lpc_order samples at the head of the signal frame (this part may be a random integer number of samples, and the integer number ranges from 0 to lpc_order−1) and the succeeding T0 samples are removed, the remaining samples of the signal frame are split into several sub-frames, thus ensuring that each sub-frame uses consistent samples for LTP synthesis and obtaining consistent LTP gains. Therefore, the embodiment solves the problem caused by simple average framing in the prior art that gains between sub-frames are inconsistent, reduces the computational complexity, and reduces the bits for gain quantization, without impacting the performance.

Before framing, it is impossible to know the pitch T[0] of the first sub-frame. However, because the pitch in a signal frame varies slightly and T[0] is a value that fluctuates slightly in the T0 range, for example, T[0]∈[T0−2, T0+2], the foregoing embodiments substitute the pitch T0 of the entire signal frame for the pitch T[0] of the first sub-frame, remove the samples inapplicable to LTP synthesis, split the remaining samples of the signal frame into several sub-frames, and use the sub-frame length after the splitting as the final sub-frame length directly.

Figure 8:
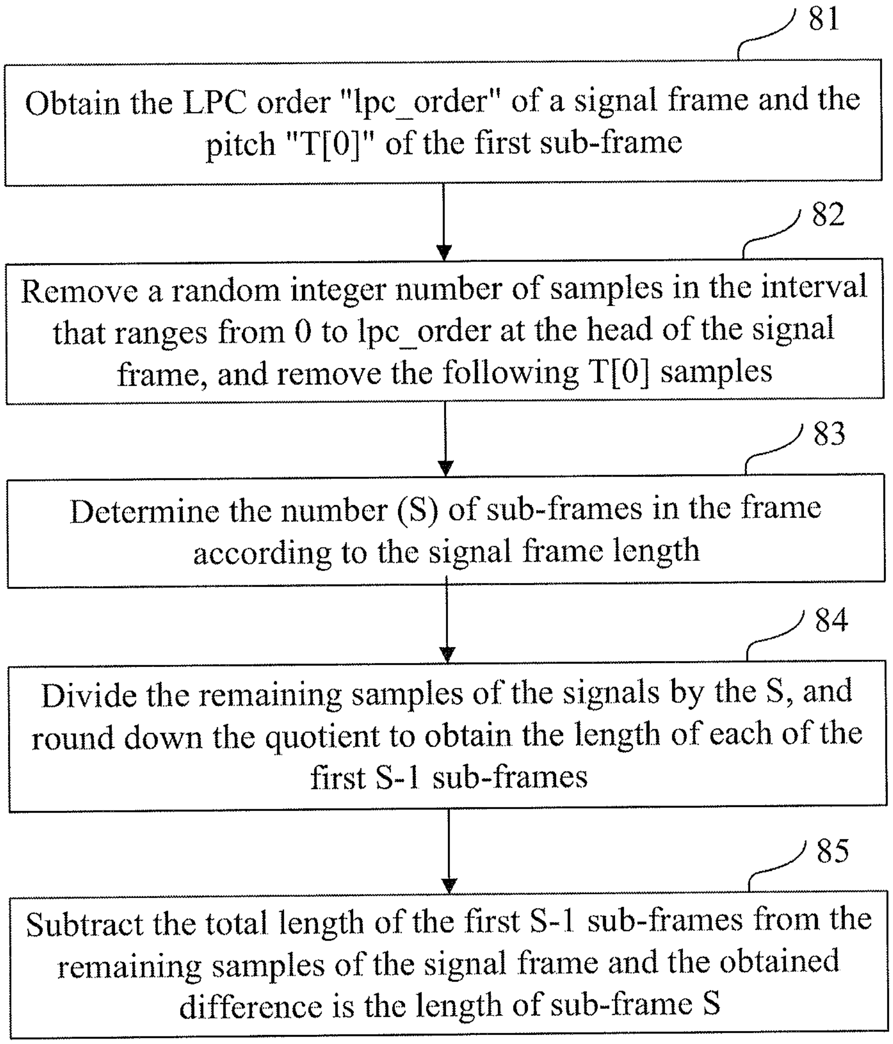
FIG. 8 is a flowchart of another framing method according to an embodiment of the present invention.

FIG. 8 shows another framing method in an embodiment of the present invention. This embodiment assumes that the obtained signal is one signal frame. The method includes the following steps:

Step 81: Obtain the LPC prediction order "lpc_order" and the pitch "T[0]" of the first sub-frame of a signal frame.

In this embodiment, the pitch T[0] of the first sub-frame is obtained in pre-framing mode. Specifically, the pitch T0 of the entire signal frame is used as the pitch of the first sub-frame to split the frame. After the length of the first sub-frame is obtained, the pitch of the first sub-frame is determined through search within the fluctuation range of the pitch of the signal frame.

Step 82: Remove a random integer number of samples in the interval that ranges from 0 to lpc_order at the head of the signal frame, and remove the succeeding T[0] samples.

Step 83: Determine the number (S) of sub-frames in the frame according to the signal frame length.

Step 84: Divide the number of remaining samples of the signal frame by the S, and round down the quotient to obtain the length of each of the first S-1 sub-frames.

For simplicity, this step is omissible, and the sub-frame length calculated previously can be used for the subsequent calculation directly.

Step 85: Subtract the total length of the first S-1 sub-frames from the remaining samples of the signal frame. The obtained difference is the length of the Sth sub-frame.

Figure 9:
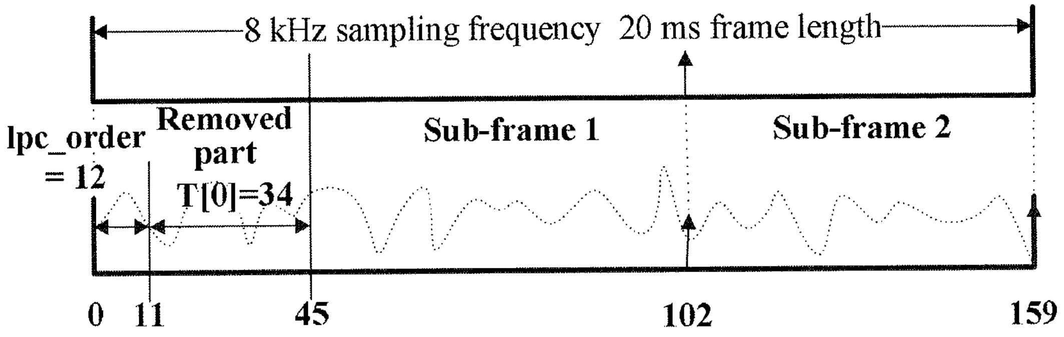
FIG. 9 shows an instance of the framing method shown in FIG. 8.

As shown in FIG. 9, this embodiment still assumes that the sampling rate is 8 kHz, and that a frame of 20 ms length is split into 2 sub-frames. The signal frame length is L=160 samples. The lpc_order of the obtained signal frame is 12 (samples), and the pitch T0 of the obtained signal frame is 35. First, pre-framing is performed, and use T0=35 as the best pitch T[0] of the first sub-frame. After the first lpc_order samples (12) and the succeeding T0 samples (35) are removed from the signal frame, the remaining L−(lpc_order+T0)=160−47=113 samples are divided by 2, and the quotient is rounded down. The result is that the length of the first sub-frame is 56 samples. After the length of the first sub-frame is obtained, the T0 fluctuation range, namely, T[0]∈[T0−2, T0+2], is searched to determine the best pitch T[0] (which is equal to 34 samples) of the first sub-frame. The framing is performed again according to the obtained best pitch T[0] of the first sub-frame: After the first lpc_order samples (12) and the succeeding T[0] samples (34) are removed from the signal frame, the remaining L−(lpc_order T[0])=160−46=114 samples are split by 2, and the quotient is rounded down. The result is that the length of the first sub-frame is 57 samples. The length of the second sub-frame, namely, the length of the last sub-frame, is 114−57=57 samples.

In the framing method provided in this embodiment, pre-framing is performed first to obtain the pitch of the first sub-frame; after all or part of the first lpc_order samples at the head of the signal frame (this part may be a random integer number of samples, and the integer number ranges from 0 to lpc_order) and the succeeding T[0] samples of the first sub-frame are removed, the remaining samples of the signal frame are split into several sub-frames, thus ensuring that each sub-frame uses consistent samples for LTP synthesis and obtaining consistent LTP gains. Therefore, the embodiment solves the problem caused by simple average framing in the prior art that gains between sub-frames are inconsistent, reduces the computational complexity, and reduces the bits for gain quantization, without impacting the performance.

Figure 13:
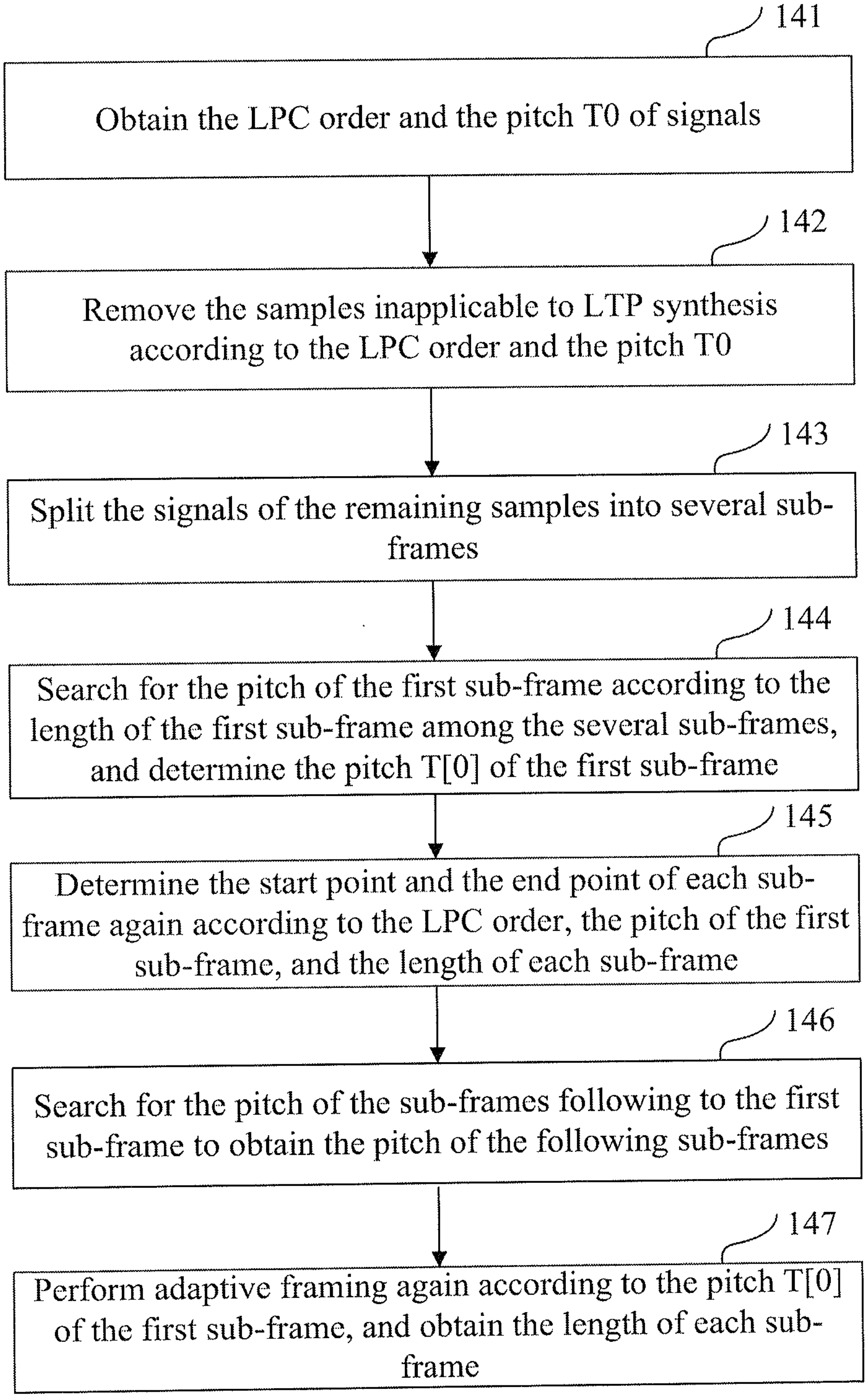
FIG. 13 is a flowchart of a framing method according to an embodiment of the present invention.

FIG. 13 shows another framing method in an embodiment of the present invention. This embodiment assumes that the obtained signal is one signal frame. The method includes the following steps:

Step 141: Obtain the LPC prediction order and the pitch T0 of signal.

Step 142: Remove the samples inapplicable to LTP synthesis according to the LPC prediction order and the pitch T0.

Step 143: Split the remaining samples of the signal into several sub-frames.

Steps 141-143 are a process of performing adaptive framing according to the pitch T0 to obtain the length of each sub-frame, and have been described in the foregoing embodiments.

Step 144: Search for the pitch of the first sub-frame according to the length of the first sub-frame among the several sub-frames, and determine the pitch T[0] of the first sub-frame.

In step 143 in this embodiment, the remaining samples are split into several sub-frames; after the length of the first sub-frame is obtained, the fluctuation range of the pitch T0 of the speech frame, for example, T[0]∈[T0−2, T0+2], is searched to determine the pitch T[0] of the first sub-frame.

Step 145: Determine the start point and the end point of each sub-frame again according to the LPC prediction order, the pitch of the first sub-frame, and the length of each sub-frame.

In this embodiment, after the pitch T[0] of the first sub-frame is determined, T[0] may be different from T0, so that the start point of the first sub-frame may change after the samples which are inapplicable to LTP synthesis are removed again. The start point and the end point of the first sub-frame need to be adjusted. Because the sub-frame length obtained in step 143 is still used here, the start point and the end point of each sub-frame following to the first sub-frame need to be determined again. In this case, it is possible that the length of each sub-frame does not change, and that the sum of the lengths of all sub-frames is not equal to the number of the remaining samples of the signal, but this possibility does not impact the effect of this embodiment. In some embodiments, as an additional optimization measure, the length of the first S-1 sub-frames keeps unchanged; the total length of the first S-1 sub-frames is subtracted from the number of the remaining samples of the signal; and the obtained difference serves as the length of the S sub-frame.

In this embodiment, the length of each sub-frame obtained in step 143 is still used, and the length of each sub-frame is not determined again, thus reducing the computation complexity.

After the pitch T[0] of the first sub-frame is determined, removing the samples inapplicable to LTP synthesis again may be removal of the first lpc_order samples at the head of the signal frame and the succeeding T[0] samples, or removal of a random integer number of samples in the interval that ranges from 0 to lpc_order−1 at the head of the signal frame and the succeeding T[0] samples.

Step 146: Search for the pitch of the sub-frames following to the first sub-frame to obtain the pitch of the following sub-frames.

In some embodiments, the pitch of the sub-frames following to the first sub-frame may be searched out, and therefore, the pitch of all sub-frames is obtained, thus facilitating removal of the long term correlation in the signal and facilitating the decoding at the decoder. The method for determining the pitch of the following sub-frames is described in step 144, and is not described further.

In some embodiments, step 146 about determining the pitch of following sub-frames may occur before step 145, without affecting the fulfillment of the objectives of the present invention. In other embodiments, step 146 may be combined with step 144. That is, in step 144, the pitch of each sub-frame is searched out to obtain the pitch of each sub-frame, including the pitch T[0] of the first sub-frame. Therefore, the embodiments of the present invention do not limit the occasion of determining the pitch of following sub-frames. All variations of the embodiments provided herein for fulfilling the objectives of the present invention are covered in the scope of protection of the present invention.

Step 147: Perform adaptive framing again according to the pitch T[0] of the first sub-frame, and obtain the length of each sub-frame.

In some embodiments, to determine each sub-frame more properly to obtain more consistent LTP gains and achieve better technical effects of the present invention, the speech frame may be split for a second time according to the pitch T[0] of the first sub-frame to obtain the length of each sub-frame again.

The method for splitting the speech frame for a second time may be: Remove the samples inapplicable to LTP synthesis again according to the LPC prediction order and the pitch T[0] of the first sub-frame, and split the newly obtained remaining samples of the signal into several sub-frames.

Specifically, determine the number (S) of sub-frames in the frame to be split according to the signal length; divide the regained number of the remaining samples of the signal by the S, and round down the quotient to obtain the length of each of the first S-1 sub-frames, namely, ⌊(L−lpc_order−T[0])/S⌋, where L is the frame length, and ⌊*⌋ refers to rounding down, for example, ⌊1.2⌋=⌊1.9⌋=1; and subtract the total length of the first S-1 sub-frames from the regained remaining samples of the signal, and the obtained difference is the length of the Sth sub-frame.

In some embodiments, step 146 may occur after step 147.

In the framing method provided in this embodiment, the pitch of the first sub-frame is obtained first through framing, and then the start point and the end point of each sub-frame are determined again according to the LPC prediction order, the pitch of the first sub-frame, and the length of each sub-frame, thus making the LTP gain more consistent between the sub-frames.

Through a second framing operation, this embodiment further ensures all sub-frames after division to use consistent samples for LTP synthesis and obtain consistent LTP gains. Therefore, the embodiment solves the problem caused by simple average framing in the prior art that gains between sub-frames are inconsistent, reduces the computational complexity, and reduces the bits for gain quantization, without impacting the performance.

In this embodiment, the pitch of the sub-frames following to the first sub-frame is searched out, and therefore, the pitch of all sub-frames is obtained, thus facilitating removal of the long term correlation in the signal and facilitating the decoding at the decoder.

Figure 10:
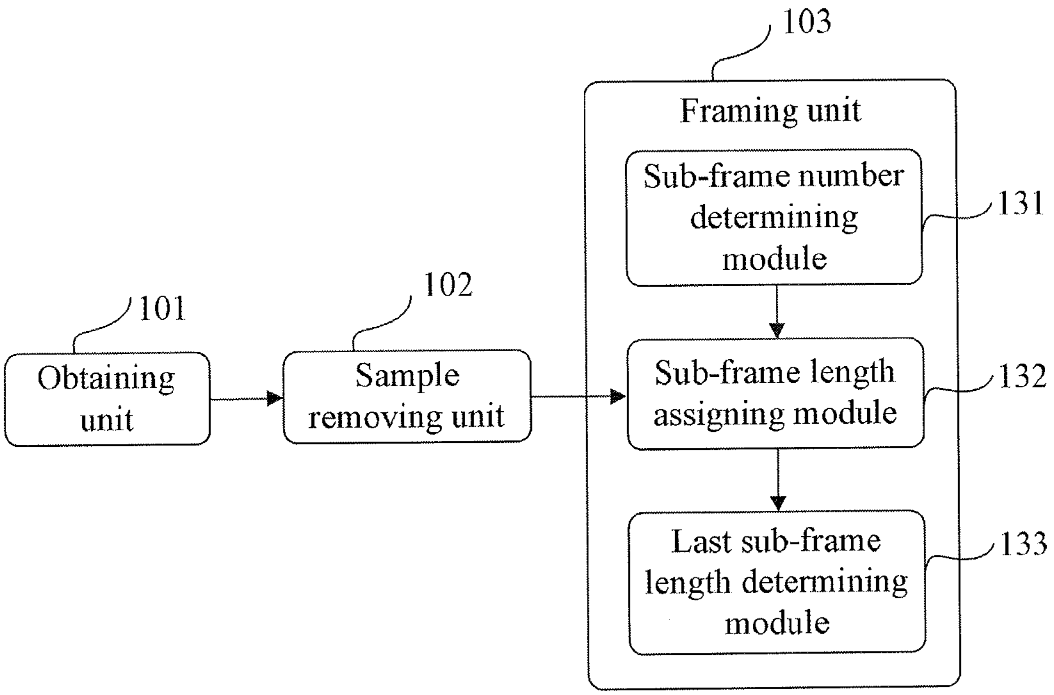
FIG. 10 shows a structure of a framing apparatus according to an embodiment of the present invention.

As shown in FIG. 10, a framing apparatus provided in an embodiment of the present invention includes:

- an obtaining unit 101, configured to obtain the LPC prediction order and the pitch of the signal;
- a sample removing unit 102, configured to remove the samples inapplicable to LTP synthesis according to the LPC prediction order and the pitch obtained by the obtaining unit 101; and
- a framing unit 103, configured to split the remaining samples of the signal into several sub-frames after the sample removing unit 102 removes the inapplicable samples.

As shown in FIG. 10, the framing unit 103 includes:

- a sub-frame number determining module 131, configured to: determine the number (S) of sub-frames in the frame to be split according to the signal frame length;
- a sub-frame length assigning module 132, configured to round down a quotient of dividing a number by the S to obtain the length of each of the first S-1 sub-frames, where the number is the number of the remaining samples of the signal frame after the sample removing unit 102 performs the removal, and the S is determined by the sub-frame number determining module; and
- a last sub-frame length determining module 133, configured to subtract the total length of the first S-1 sub-frames from the remaining samples of the signal frame, where the obtained difference is the length of the Sth sub-frame.

Figure 11:
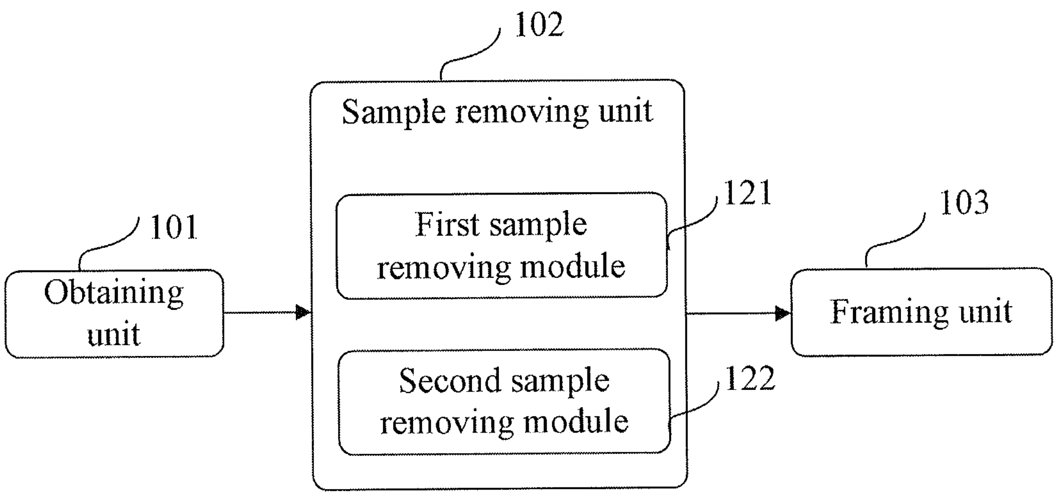
FIG. 11 shows a structure of another framing apparatus according to an embodiment of the present invention.

FIG. 11 shows another embodiment, where the sample removing unit 102 is the first sample removing module 121. The first sample removing module 121 is configured to remove the lpc_order samples at the head of the signal frame and the succeeding T0 samples, whereupon the framing unit 102 splits the frame into several sub-frames.

In another embodiment, the sample removing unit 102 is the second sample removing module 122. The second sample removing module 122 is configured to remove a part of the lpc_order samples at the head of the signal frame (this part is a random integer number of samples, and the integer number ranges from 0 to lpc_order−1) and the succeeding T0 samples, whereupon the framing unit 102 assigns the length of each sub-frame.

Figure 12:
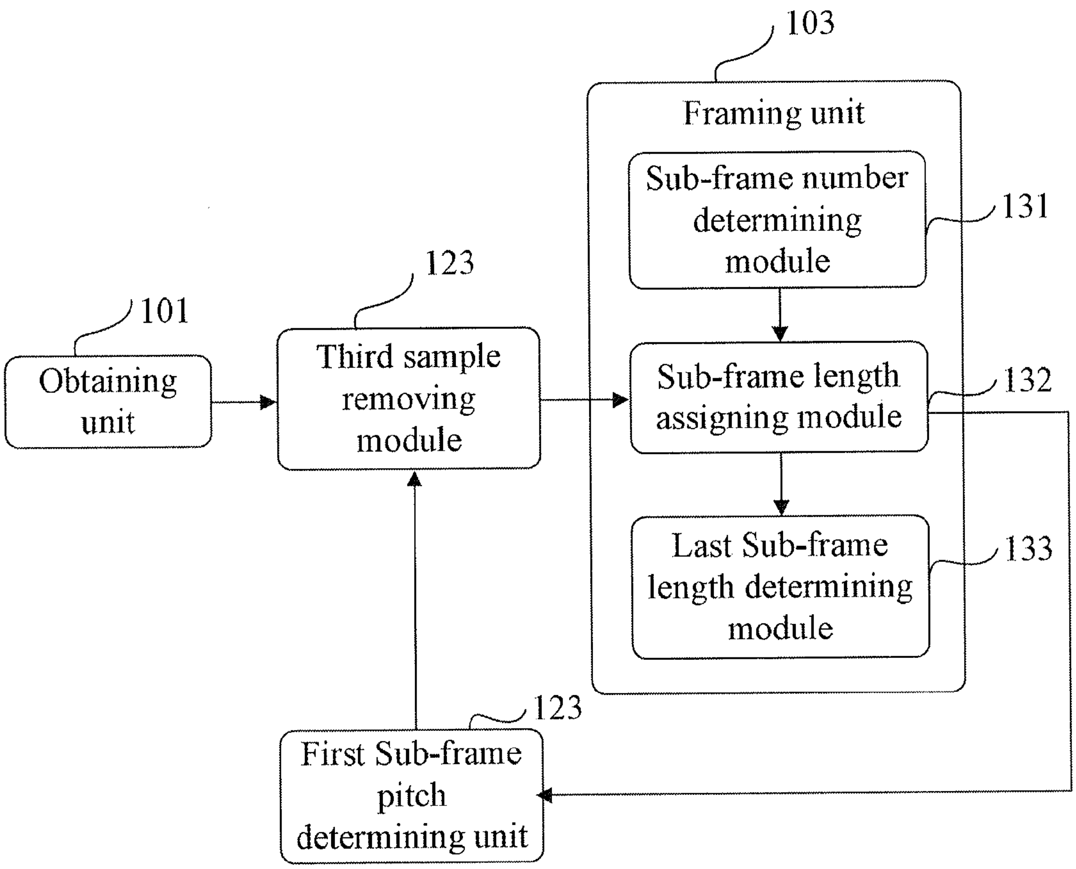
FIG. 12 shows a structure of another framing apparatus according to an embodiment of the present invention.

As shown in FIG. 12, a framing apparatus provided in another embodiment of the present invention includes:

- a first sub-frame pitch determining unit 120, configured to search the fluctuation range of the pitch of the signal to determine the pitch of the first sub-frame according to the length of the first sub-frame obtained by the sub-frame length assigning module 132.

The sample removing unit 102 is the third sample removing module 123. The third sample removing module 123 is configured to remove a random integer number of samples at the head of the signal frame and the succeeding T[0] samples (the integer number ranges from 0 to lpc_order; lpc_order is the LPC prediction order; and T[0] is the pitch of the first sub-frame), whereupon the framing unit 102 splits the frame into several sub-frames. In some embodiments, the framing unit 102 is also configured to determine the start point and the end point of each sub-frame again according to the length of each sub-frame.

In the framing apparatus provided in this embodiment, according to the LPC prediction order and the pitch obtained by the obtaining unit 101, after the samples inapplicable to LTP synthesis are removed by the sample removing unit 102, the framing unit 103 splits the remaining samples of the signal into several sub-frames. No matter whether the sample removing unit 102 is the first sample removing module 121, the second sample removing module 122, or the third sample removing module 123, the apparatus ensures each sub-frame after division to use consistent samples for LTP synthesis and obtain consistent LTP gains. Therefore, the embodiment solves the problem caused by simple average framing in the prior art that gains between sub-frames are inconsistent, reduces the computational complexity, and reduces the bits for gain quantization, without impacting the performance.

The framing method implemented by the framing apparatus provided in an embodiment of the present invention is further described below:

The obtaining unit 101 obtains the LPC prediction order and the pitch T0 of the signal. In some embodiments, if the signal frame is split beforehand, this step may also be: obtaining the pitch of the first sub-frame in place of the pitch "T0". For ease of description, this embodiment takes T0 as an example.

The sample removing unit 102 removes the samples inapplicable to LTP synthesis according to the LPC prediction order and the pitch T0. In some embodiments, the first sample removing module 121 removes the first lpc_order samples at the head of the signal frame and the succeeding T0 samples; in other embodiments, the second sample removing module 122 removes a random integer number of samples at the head of the signal frame (the integer number ranges from 0 to lpc_order−1) and the succeeding T0 samples.

The framing unit 103 splits the remaining samples of the signal into several sub-frames. Specifically, the sub-frame number determining module 131 determines the number (S) of sub-frames of a frame to be split according to the length of the signal. The sub-frame length assigning module 132 divides the number of the remaining samples of the signal by the S, and rounds down the quotient to obtain the length of each of the first S-1 sub-frames. The last sub-frame length determining module 133 subtracts the total length of the first S-1 sub-frames from the remaining samples of the signal frame, and obtains a difference as the length of the Sth sub-frame.

Further, the speech frame may be split for a second time. The first sub-frame pitch determining unit 120 searches for the pitch of the first sub-frame according to the length of the first sub-frame among the several sub-frames, and determines the pitch T[0] of the first sub-frame.

The third sample removing module 123 removes the first lpc_order samples at the head of the signal frame and the succeeding T[0] samples of the first sub-frame, or removes a random integer number of samples at the head of the signal frame (the integer number ranges from 0 to lpc_order) and the succeeding T[0] samples of the first sub-frame. Afterward, the framing unit 102 splits the frame for a second time. In some embodiments, the framing unit 102 may determine the start point and the end point of each sub-frame again according to the length of each sub-frame determined in the first framing operation. In other scenarios, the framing unit 102 determines the start point and the end point of each sub-frame again and then splits the speech frame for a second time.

The methods in the embodiments of the present invention may be implemented through a software module. When being sold or used as an independent product, the software module may also be stored in a computer-readable storage medium. The storage medium may be a read-only memory, a magnetic disk or a compact disk.

All functional units in the embodiments of the present invention may be integrated into a processing module, or exist independently, or two or more of such units are integrated into a module. The integrated module may be hardware or a software module. When being implemented as a software module and sold or used as an independent product, the integrated module may also be stored in a computer-readable storage medium. The storage medium may be a read-only memory, a magnetic disk or a compact disk.

Detailed above are a framing method and apparatus under the present invention. Although the invention has been described through several exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A framing method performed by a framing apparatus including a non-transitory computer readable medium encoded to perform the operation comprising:

obtaining, by at least a part of hardware-based processing module, a Linear Prediction Coding (LPC) prediction order and a pitch of a speech signal, wherein the speech signal is frame based;

removing, by said at least a part of hardware-based processing module, samples of the speech signal that are inapplicable to Long Term Prediction (LTP) synthesis according to the LPC prediction order and the pitch; and splitting, by said at least a part of hardware-based processing module, remaining samples of the speech signal into several sub-frames.

2. The method of claim 1, wherein the removing samples of the speech signal that are inapplicable to Long Term Prediction (LTP) synthesis comprises:

removing at least one sample of the first LPC prediction order number of samples at a head of the speech signal and succeeding pitch number of samples to the at least one sample.

3. The method of claim 2, wherein the removing samples of the speech signal that are inapplicable to Long Term Prediction (LTP) synthesis comprises:

removing the first LPC prediction order number of samples at the head of the speech signal and the succeeding pitch number of samples to the first LPC prediction order number of samples at the head of the speech signal.

4. The method of claim 2, wherein the removing samples of the speech signal that are inapplicable to Long Term Prediction (LTP) synthesis comprises:

removing a random integer number of samples in a interval that ranges from 0 to LPC prediction order minus 1 at the head of the speech signal and the succeeding pitch number of samples to the random integer number of samples.

5. The method of claim 1, wherein the splitting remaining samples of the speech signal into several sub-frames comprises:

determining a number (S) of sub-frames to be split according to the speech signal length;

dividing the number of remaining samples of the speech signal by the S, and round down the quotient to obtain length of each of first S-1 sub-frames; and subtracting total length of the first S-1 sub-frames from the remaining samples of the speech signal to obtain a difference as length of the Sth sub-frame.

6. The method of claim 2, wherein performing pre-framing before obtaining the pitch of the speech signal; the obtaining the pitch of the speech signal is obtaining a pitch of the first sub-frame after pre-framing.

7. The method of claim 6, wherein the pre-framing comprises:

using a pitch of a entire speech signal as the pitch of the first sub-frame to split the speech signal adaptively to obtain length of the first sub-frame; and determining the pitch of the first sub-frame through search within the fluctuation range of the pitch of the speech signal.

8. The method of claim 1, after splitting remaining samples of the speech signal into several sub-frames, further comprising:

searching for a pitch of a first sub-frame according to the length of the first sub-frame among the several sub-frames, and determining the pitch of the first sub-frame; and determining a start point and a end point of each sub-frame again according to the LPC prediction order, the pitch of the first sub-frame, and the length of each sub-frame.

9. The method of claim 1, after splitting remaining samples of the speech signal into several sub-frames, further comprising:

searching for a pitch of a first sub-frame according to the length of the first sub-frame among the several sub-frames, and determining the pitch of the first sub-frame;

removing samples inapplicable to LTP synthesis again according to the LPC prediction order and the pitch of the first sub-frame; and splitting the newly obtained remaining samples of the speech signal into several sub-frames.

10. A framing method performed by a framing apparatus including a non-transitory computer readable medium encoded to perform the operation comprising:

obtaining a Linear Prediction Coding (LPC) prediction order and a pitch of a speech signal, wherein the speech signal is frame based;

removing samples of the speech signal that are inapplicable to Long Term Prediction (LTP) synthesis according to the LPC prediction order and the pitch;

splitting remaining samples of the speech signal into several sub-frames;

searching for the pitch of the first sub-frame according to the length of the first sub-frame among the several sub-frames, and determining the pitch of the first sub-frame;

determining the start point and the end point of each sub-frame again according to the LPC prediction order, the pitch of the first sub-frame, and the length of each sub-frame;

removing the samples of the speech signal that are inapplicable to Long Term Prediction (LTP) synthesis again according to the LPC prediction order and the pitch of the first sub-frame; and splitting newly obtained remaining samples of the speech signal into several sub-frames wherein the above processing steps are performed by at least a part of hardware-based processing module.

11. The method of claim 10, wherein the removing the samples of the speech signal that are inapplicable to Long Term Prediction (LTP) synthesis again comprises:

removing the first LPC prediction order number of samples at the head of the speech signal and the succeeding pitch of the first sub-frame number of samples to the first LPC prediction order number of samples at the head of the speech signal.

12. The method of claim 10, wherein the splitting newly obtained remaining samples of the speech signal into several sub-frames comprises:

determining the number (S) of sub-frames to be split according to the speech signal length;

dividing the number of the newly obtained remaining samples of the speech signal by the S, and round down the quotient to obtain length of each of the first S-1 sub-frames; and subtracting total length of the first S-1 sub-frames from the newly obtained remaining samples of the speech signal to obtain a difference as length of the Sth sub-frame.

13. A framing apparatus including a non-transitory computer readable medium encoded to perform the operation comprising:

an obtaining unit, configured to obtain a Linear Prediction Coding (LPC) prediction order and a pitch of a speech signal, wherein the speech signal is frame based;

a sample removing unit, configured to remove samples inapplicable to Long Term Prediction (LTP) synthesis according to the LPC prediction order and the pitch obtained by the obtaining unit; and a framing unit, configured to split remaining samples of the speech signal into several sub-frames after the sample removing unit removes the inapplicable samples wherein the above processing units comprise at least a part of hardware-based processing module.

14. The apparatus of claim 13, wherein the sample removing unit is either of the following modules:

a first sample removing module, configured to remove the first LPC prediction order number of samples at the head and the pitch number of samples of the speech signal; or a second sample removing module, configured to remove a random integer number of samples in the interval that ranges from 0 to LPC prediction order minus 1 at the head and the pitch number of samples of the speech signal.

15. The apparatus of claim 13, wherein the framing unit comprises:

a sub-frame number determining module, configured to determine the number (S) of sub-frames to be split according to the speech signal length;

a sub-frame length assigning module, configured to round down a quotient of dividing a number by the S to obtain the length of each of the first S-1 sub-frames, where the number is the number of the remaining samples of the speech signal frame after the sample removing unit performs the removal, and the S is determined by the sub-frame number determining module; and a last sub-frame length determining module, configured to subtract total length of the first S-1 sub-frames from the remaining samples of the speech signal to obtain a difference as length of the Sth sub-frame.

16. The apparatus of claim 13, further comprising:

a first sub-frame pitch determining unit, configured to search the fluctuation range of the pitch of the speech signal to determine the pitch of the first sub-frame according to the length of the first sub-frame obtained by the sub-frame length assigning module.

17. The apparatus of claim 16, wherein:

the sample removing unit is a third sample removing module and configured to remove a random integer number of samples in the interval that ranges from 0 to LPC prediction order at the head and the succeeding pitch of the first sub-frame number of samples of the speech signal; and the framing unit is configured to determine the start point and the end point of each sub-frame again according to the length of each sub-frame.

18. The apparatus of claim 16, wherein:

the sample removing unit is a third sample removing module and configured to remove a random integer number of samples in the interval that ranges from 0 to LPC prediction order at the head and the succeeding pitch of the first sub-frame number of samples of the speech signal; and the framing unit is configured to split remaining samples of the speech signal into several sub-frames after the third sample removing module performs the removal.

* * * * *